(No Model.) G. G. HUNT. 2 Sheets—Sheet 2.
HARVESTER WHEEL.
No. 462,709. Patented Nov. 10, 1891.
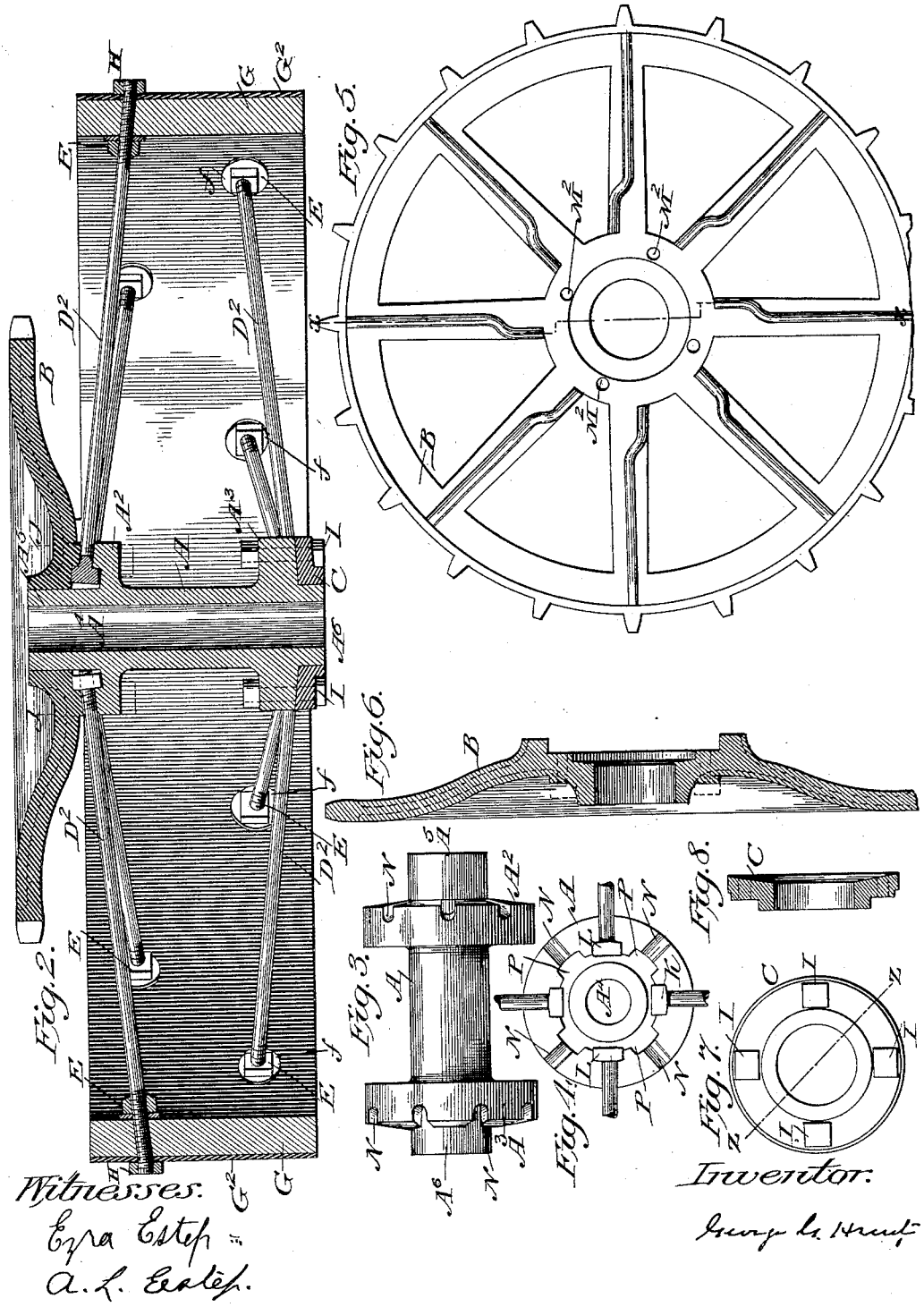

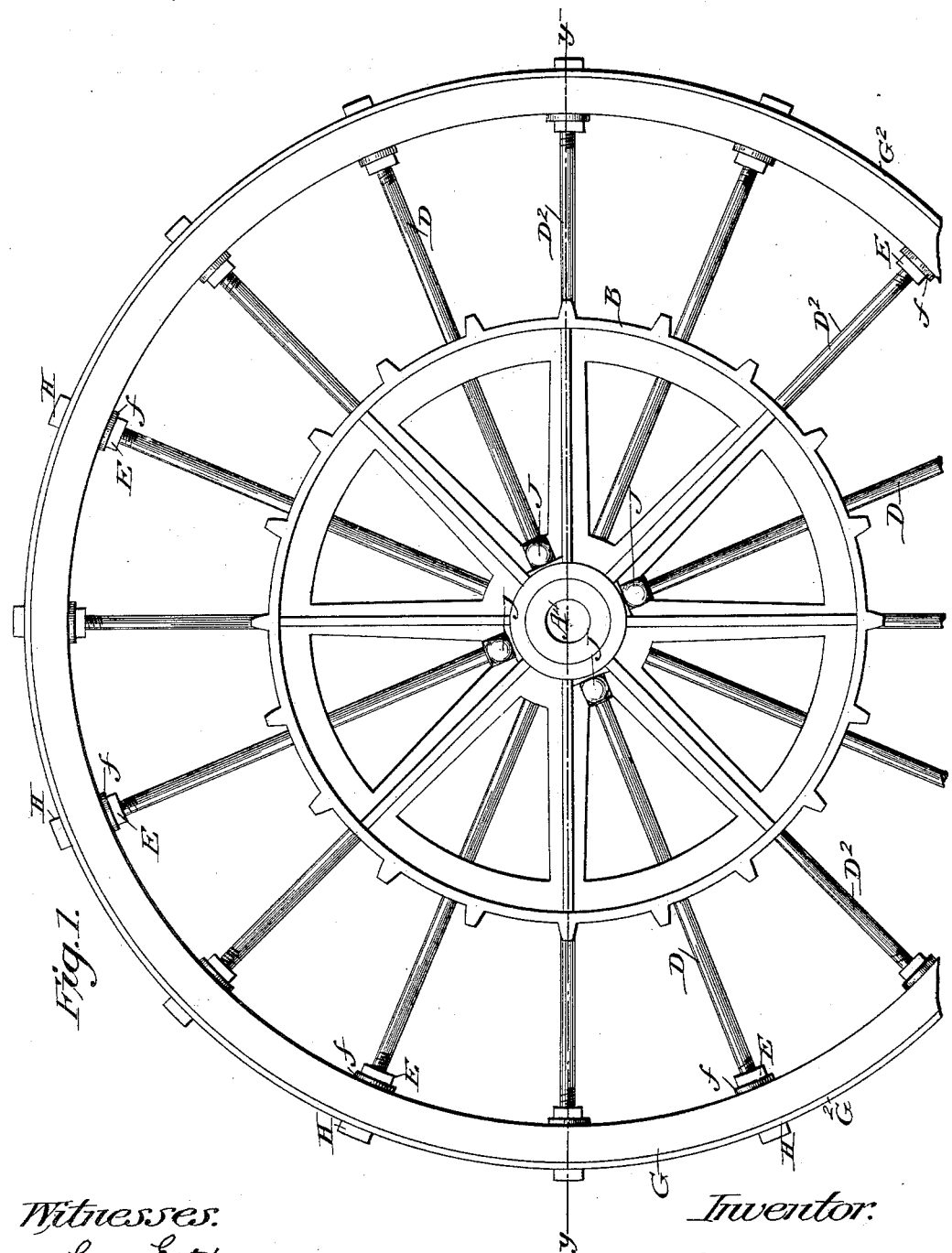

UNITED STATES PATENT OFFICE.

GEORGE G. HUNT, OF BRISTOL, ASSIGNOR TO THE PLANO MANUFACTURING COMPANY, OF PLANO, ILLINOIS.

HARVESTER-WHEEL.

SPECIFICATION forming part of Letters Patent No. 462,709, dated November 10, 1891.

Application filed April 20, 1891. Serial No. 389,714. (No model.)

*To all whom it may concern:*

Be it known that I, GEORGE G. HUNT, a citizen of the United States, residing at Bristol, in the county of Kendall and State of Illinois, have invented a new and useful Improvement in Harvester-Wheels, of which the following is a specification.

My improvement relates to the ground or driving wheel from which motion is communicated to the operative mechanism of the machine; and the objects of my improvement are, first, to obtain a wheel which will stand the changes of weather and climate to which such wheels are subject, and, second, to be able to construct such a wheel in a comparatively easy and cheap manner. I attain these objects by the construction illustrated in the drawings, in which—

Figure 1 is a side elevation of my wheel, looking from the side to which the main sprocket-wheel is attached. Fig. 2 is a sectional view of one-half the wheel, taken on a line, as $y\ y$, Fig. 1, across the wheel and at right angles to the edges of the rim. Fig. 3 is an elevation or side view of the hub of the wheel. Fig. 4 is an end view of the same, showing four of the spokes as located in the hub. Fig. 5 is an inside view of the main driving-sprocket. Fig. 6 is a cross-section of the same on the line $x\ x$, Fig. 5. Fig. 7 is a view of the outside of an annular plate or cap which serves to hold the spokes in place. Fig. 8 is a central cross-section of the same on a line, as $z\ z$, Fig. 7.

Similar letters refer to similar parts throughout the several views.

The wheel-rim G is steamed and bent in the ordinary way, and confined in its circular form by the tire or band $G^2$. The wheel is provided with a metallic hub A, having a central longitudinal aperture $A^4$. An axle, stationary with relation to the wheel, is inserted therein, upon which the wheel runs in the ordinary manner. This hub is provided with radial flanges $A^2\ A^3$. These flanges have those sides facing toward the ends of the hub inclined, for a purpose that will presently appear. The sides of the flanges facing toward each other may be parallel to each other and practically perpendicular to the axis of the wheel. The flanges are provided with a series of radial grooves N N corresponding to the desired number of spokes. Sixteen spokes are shown, but more may be used. The flanges are placed a suitable distance from the ends of the hub to leave projecting members $A^5\ A^6$. These members are of such lengths as to correspond with the thickness of parts which fit thereon—viz., a cap or annular plate C, Fig. 7, slides loosely upon the member $A^6$, and the main sprocket B fits in a similar manner upon the member $A^5$. The sprocket B and cap C have thin inner surfaces inclined to their axes, so as to be parallel with the inclined surfaces of the flanges on the hub. The hub-flanges are provided with recesses P P, &c., for the reception of the heads of spokes D $D^2$, &c. The radial grooves N N are of such a size as to receive entire the body part of the spokes D $D^2$, and are so arranged that when the body of the spoke lies within the groove the head of the spoke is within the recess P. The recesses P are of a suitable size and form to prevent the spokes from turning around on their axes. A clamping plate or cap C is fastened at one end of the hub by bolts I I, &c., which pass through the plate C and flange $A^3$ and hold the spokes firmly in place. The sprocket-wheel B is placed upon the member $A^5$ and fastened rigidly by bolts J J, &c., which pass through holes $M^2$, &c., between the spokes and through the flange $A^2$. The radial grooves in the flanges on the hub are equally spaced, having eight grooves in each flange. The grooves in each flange are so placed as to "stagger" the spokes, as clearly shown in the drawings; but the spokes may be placed as desired. By referring to Fig. 2 it will be seen that the spokes enter the rim at an inclination corresponding to that of the flanges on the hub. This inclination of the spokes braces the wheel against lateral strains.

The spokes are provided with long threaded outer ends, which pass through the rim and tire, where they are held firmly by internal nuts E E, screwed outwardly against substantial washers $f\ f$. After the rim has been adjusted and made round by the nuts E, the outer nuts H are tightly screwed down, and the ends of the spokes may be riveted to prevent the nuts from working loose.

From the description above given it will be evident that the well-known principle of a suspension-strain is embodied in this wheel, and the rim is held firmly in place through the medium of the tension rods or spokes, as shown.

If desirable to embody the strut or brace principle in addition, the heads of the spokes may be of a suitable thickness to fill the cavity P, so that the end of the spoke rests or abuts against the member $A^5$ or $A^6$, as shown at L.

What I claim as new, and desire to secure by Letters Patent, is—

The combination, in a harvester-wheel, of a rim provided with spoke-apertures, spokes having heads upon their inner ends, and threads upon their outer ends, nuts within the rim upon the spokes, nuts outside the rim upon the spokes, a spoke-hub having flanges provided with radial spoke-grooves, recesses in the flanges for the reception of the spoke-heads, a clamping-plate adapted to fit the end of the hub and to be bolted to one of the flanges thereof to grip the spokes and hold them rigidly in place, and a driving-sprocket adapted to be bolted to the spoke-hub to grip the spokes on that side of the wheel and to transmit motion to the operative mechanism of the machine, all substantially as specified.

GEORGE G. HUNT.

Witnesses:
EZRA ESTEP,
LE ROY GRAY.